United States Patent
Ahn et al.

(10) Patent No.: US 12,072,255 B2
(45) Date of Patent: Aug. 27, 2024

(54) HIGH-SENSITIVITY FLEXIBLE STRAIN SENSOR BASED ON DIRECT PRINTING OF MIXTURE OF METAL NANOPARTICLES AND CARBON NANOTUBES AND METHOD OF MANUFACTURING THE SAME

(71) Applicant: Seoul National University R&DB Foundation, Seoul (KR)

(72) Inventors: Sunghoon Ahn, Seongnam-si (KR); Soohong Min, Seoul (KR); Gilyong Lee, Gumi-si (KR)

(73) Assignee: Seoul National University R&DBFoundation, Seoul (KR)

( * ) Notice: Subject to any disclaimer, the term of this patent is extended or adjusted under 35 U.S.C. 154(b) by 381 days.

(21) Appl. No.: 17/441,934

(22) PCT Filed: Aug. 6, 2019

(86) PCT No.: PCT/KR2019/009756
§ 371 (c)(1),
(2) Date: Sep. 22, 2021

(87) PCT Pub. No.: WO2020/197000
PCT Pub. Date: Oct. 1, 2020

(65) Prior Publication Data
US 2022/0163416 A1    May 26, 2022

(30) Foreign Application Priority Data
Mar. 28, 2019 (KR) .......... 10-2019-0036003

(51) Int. Cl.
*G01L 1/22* (2006.01)
*B41M 3/00* (2006.01)
*B41M 5/00* (2006.01)

(52) U.S. Cl.
CPC .......... *G01L 1/2287* (2013.01); *B41M 3/006* (2013.01); *B41M 5/0023* (2013.01)

(58) Field of Classification Search
CPC .......... G01L 1/2287; G01L 1/20; G01L 1/22; B41M 3/006; B41M 5/0023
See application file for complete search history.

(56) References Cited

FOREIGN PATENT DOCUMENTS

KR  10-2008-0065080 A  7/2008
KR  10-2014-0090345 A  7/2014
(Continued)

OTHER PUBLICATIONS

Wang et al., "Highly Stretchable and Wearable Strain Sensor Based on Printable Carbon Nanotube Layers/Polydimethylsiloxane Composites with Adjustable Sensitivity", ACS Applied Materials & Interfaces, pp. 7371-7380, published Feb. 12, 2018 (Year: 2018).*

(Continued)

*Primary Examiner* — Jennifer Bahls
*Assistant Examiner* — Quang X Nguyen
(74) *Attorney, Agent, or Firm* — DALY, CROWLEY, MOFFORD & DURKEE, LLP (57) ABSTRACT

Disclosed are a flexible strain sensor and a method for manufacturing the same. A conductive line pattern is directly printed on a flexible substrate by jetting a printing material mixture of metal nanoparticles and CNTs at a high impact speed, and sandwiched between the flexible substrate and a flexible cover. The mixture is excited by aerodynamically controlling pumping timing and jetted onto the flexible substrate in an aerosolized state through a nozzle. The jetted mixture collides with the surface of the flexible substrate to create cracks, and then CNTs penetrate into the cracks and are mechanically locked with the flexible substrate. Subsequently, metal nanoparticles and CNTs are deposited thereon to a predetermined width and height, forming the conductive (Continued)

line pattern. This direct printing can be performed in a low pressure and at room temperature without using solvents or resins, thus no need for additional chemical post-treatment or heat treatment.

13 Claims, 8 Drawing Sheets

(56) References Cited

FOREIGN PATENT DOCUMENTS

| KR | 10-2015-0074623 | 7/2015 |
| KR | 10-2015-0131241 | 11/2015 |
| KR | 10-2018-0130036 | 12/2018 |

OTHER PUBLICATIONS

Lee et al., "Transparent, Flexible Strain Sensor Based on a Solution-Processed Carbon Nanotube Network", ACS Applied Materials & Interfaces, pp. 26279-26285, published Jul. 13, 2017 (Year: 2017).*

PCT International Search Report (with English Translation) dated Dec. 26, 2019 for International Application No. PCT/KR2019/009756; 4 Pages.

Min et al., "Direct Printing of Highly Sensitive, Stretchable, and Durable Strain Sensor Based on Silver Nanoparticles/Multi-walled Carbon Nanotubes Composites;" Composites Part B, 161; Dec. 2018; 7 Pages.

Woo et al., "Nanoparticle Based Wearable Sensor;" Abstract Only in English; Ceramist, vol. 22, No. 1; pp. 4-16; 13 Pages.

* cited by examiner

CREATION OF CRACKS ON SURFACE OF FLEXIBLE
SUBSTRATE BY COLLISIONS

FIG. 4

FORMING SEED LAYER OF LOCKING
STRUCTURE BY DEPOSITION

FIG. 5

REPEATED BONDING OF METAL NANOPARTICLES
AND CARBON NANOTUBES TOROUGH SEED LAYER

FIG. 6

COMPLETION OF DEPOSITION

HIGH-SENSITIVITY FLEXIBLE STRAIN SENSOR BASED ON DIRECT PRINTING OF MIXTURE OF METAL NANOPARTICLES AND CARBON NANOTUBES AND METHOD OF MANUFACTURING THE SAME

CROSS REFERENCE TO RELATED APPLICATIONS

This application is a U.S. National Stage Application of International application No. PCT/KR2019/009756 filed on Aug. 6, 2019 which is based upon and claims the benefit of priority to Korean Patent Application 10-2019-0036003, filed on Mar. 28, 2019 in the Korean Intellectual Property Office. The disclosures of the above-listed applications are hereby incorporated by reference herein in their entirety.

BACKGROUND

1. Technical Field

The present disclosure relates to the field of manufacturing technology of a strain sensor, and more particularly, a technology of manufacturing a strain sensor by directly printing a mixture of conductive nanoparticles and carbon nanotubes (CNTs) on a flexible substrate.

2. Discussion of the Related Art

The strain sensor, also called a strain gauge, is a sensor for measuring a change in length, such as displacement or deformation of an object, and is used to detect minute displacement in most cases. The strain sensor is generally composed of a resistance, and is used in a form that it is attached to an object to be measured and converts the physical strain of the object into an electrical signal for measurement. When a resistor of the strain sensor is deformed to be long and thin due to deformation of the object to be measured, a resistance of the resistor may increase. When it becomes thicker and shorter, its resistance value decreases. Therefore, by measuring the change in the resistance value of the resistor of the strain sensor, it is possible to measure a minute deformation of the object to be measured.

For the strain sensor, sensitivity and measurable range are important performance indicators. It should be able to measure sensitively the deformation degree of the object to be measured. A strain sensor with good sensitivity can accurately measure the deformation degree of the object to be measured. Depending on the characteristics of the object to be measured, the degree of deformation may be large. In order to be applied to such an object to be measured, the measurable range of the strain sensor needs to be wide enough to sufficiently cover the deformation range of the object to be measured. It is required to develop a strain sensor that satisfies both of these factors well.

In addition, a technique for printing conductive lines constituting a measurement grid of a strain sensor on a substrate by an inkjet printing method is known. However, the method of manufacturing the strain sensor by the conventional inkjet printing method requires a predetermined chemical post-treatment after printing. This is because, due to the characteristics of the inkjet printing method, an organic solvent is added to the ink raw material in addition to metal nanoparticles. In addition, the conductive line of the strain sensor must be firmly bonded to the substrate. The deformation of the object to be measured is transmitted to the conductive line through the substrate. In spite of frequent deformation or large deformation of the object to be measured, the bonding state between the conductive line and the substrate needs to be maintained well. Conventionally, when liquid ink mixed with an organic solvent is used as a material for the conductive line, the liquid ink is simply applied to the surface of the substrate and then dried through chemical post-treatment and heat treatment process so that the conductive line is bonded to the substrate. In this type of bonding, the conductive line cannot penetrate into the surface of the substrate, and thus the bonding of the mechanically and securely locked structures to each other cannot be achieved. As the number or degree of expansion and contraction of the substrate according to the deformation of the object to be measured increases, the bonding durability between the substrate and the conductive line may be weakened.

Conventional techniques for fabricating the strain sensor may satisfy only a part of high sensitivity, a wide measurable range, and high durability due to a strong coupling between the conductive line and the substrate, but not all of them at the same time. It seems that it is because the optimal material and manufacturing method that can satisfy these requirements at the same time have not been found.

SUMMARY

Some embodiments of the present disclosure provide a method of manufacturing a strain sensor having sensing characteristics that can accurately measure the deformation of an object to be measured due to its excellent sensitivity and can also be applied to an object with a wide degree of deformation due to its wide measurable deformation range. In addition, the present disclosure is to provide the strain sensor manufactured by this method.

Some embodiments of the present disclosure provide a method for manufacturing a strain sensor that can be easily manufactured, without the need for chemical post-treatment and separate heat treatment, by jetting aerodynamically a powdery printing material mixture containing only metal nanoparticles and CNTs, without containing liquid organic solvents such as solvents, on a flexible substrate at a high speed to directly print a conductive line for a strain sensor on the substrate, and that has excellent durability due to a mechanical locking structure between the conductive line and the substrate. In addition, the present disclosure is to provide the strain sensor manufactured by this method.

The problem to be solved by the present disclosure is not limited to the above-described ones, and may be variously expanded without departing from the spirit and scope of the present disclosure.

In one aspect, the present disclosure is directed to a method of manufacturing a flexible strain sensor based on direct printing of a mixture of metal nanoparticles and CNTs. The method includes: placing a flexible substrate on a movable stage in a working chamber in which the movable stage capable of a desired movement according to a control signal, and an nozzle capable of jetting toward an upper surface of the movable stage are installed therein, and with which a first pressure control unit capable of controlling an internal pressure of the working chamber is combined, and preparing a printing material mixture including metal nanoparticles and CNTs in a form of powder to be input into a printing material tank provided with an upper outlet communicating with a nozzle through a first communication pipe and a lower inlet to which a second pressure control unit capable of controlling pressure is combined; controlling, by 
a control unit, a movement of the movable stage by providing a predetermined movement control signal to the movable stage to move the flexible substrate at a desired speed along a path corresponding to a predetermined conductive line pattern of a strain sensor; forming a relatively low pressure atmosphere inside the working chamber by operating the first pressure control unit, and simultaneously a relatively high pressure atmosphere at a lower inlet of the printing material tank by operating the second pressure control unit; in parallel with the controlling the movement of the movable stage, forcibly conveying the printing material mixture in an aerosolized state through the first communication pipe from the printing material tank, to be jetted out through the nozzle toward a surface of the flexible substrate by a compression wave caused by a pressure difference between the low pressure atmosphere and the high pressure atmosphere; directly printing a predetermined conductive line pattern of the strain sensor on the flexible substrate through a process in which the printing material mixture jetted out through the nozzle collides with the surface of the flexible substrate to create cracks on the surface, and the CNTs penetrate into the cracks and are mechanically locked with the flexible substrate, and then following metal nanoparticles and CNTs of the printing material mixture are deposited to a predetermined width and height on the surface of the flexible substrate; connecting first and second lead wires, which electrically extend to protrude out of the flexible substrate, to both ends of the predetermined conductive line pattern of the strain sensor; and bonding a flexible cover having a same size as the flexible substrate to the surface of the flexible substrate on which the predetermined conductive line pattern is printed, so that the predetermined conductive line pattern is sandwiched between the flexible substrate and the flexible cover.

In an example embodiment, the flexible substrate and the flexible cover may have a same shore hardness of 10 to 70 based on shore A or have a same shore hardness of 22 or less based on shore D.

In an example embodiment, the flexible substrate and the flexible cover may be made from polydimethylsiloxane (PDMS).

In an example embodiment, the predetermined conductive line pattern may include a plurality of linear conductive lines each of which extends linearly by a predetermined length in a first direction, and the plurality of linear conductive lines are arranged side by side to form a series connection while maintaining a predetermined distance between each other in a second direction perpendicular to the first direction. In addition, a cross-sectional structure of the plurality of linear conductive lines may include a seed layer, mechanically locked on the surface of the flexible substrate, formed by making the CNTs penetrate and fix into cracks irregularly formed on the surface of the flexible substrate; and a mixture layer of the metal nanoparticles and the CNTs formed by depositing the metal nanoparticles and the CNTs on the seed layer to have a predetermined width and height.

In an example embodiment, the directly printing of the predetermined conductive line pattern may include forming a seed layer mechanically locked on the surface of the flexible substrate by making the printing material mixture of the metal nanoparticles and the CNTs from the nozzle collide the surface of the flexible substrate to form irregular cracks so that the CNTs penetrate and fix into the cracks on the surface of the flexible substrate; and printing the predetermined conductive line pattern on the surface of the flexible substrate by applying the printing material mixture subsequently jetted to the seed layer at a high speed to be deposited on the seed layer to a predetermined width and height through bonding with the CNTs of the seed layer.

In an example embodiment, wherein the directly printing of the predetermined conductive line pattern may include monitoring, by a monitoring unit, a size of the printing material mixture deposited on the surface of the flexible substrate to be provided to the control unit; and controlling, by the control unit, movement speed of the movable stage on which the flexible substrate is placed based on the monitored size from the monitoring unit.

In an example embodiment, the relatively low pressure atmosphere in the working chamber may be a pressure atmosphere of 1 torr to 10 torr.

In an example embodiment, the controlling of the movement of the movable stage may include adjusting, by the control unit, a distance from the nozzle to the movable stage so that the printing material mixture is aerodynamically focused on the surface of the flexible substrate when the printing material mixture is jetted out through the nozzle.

In an example embodiment, the mixing ratio between the metal nanoparticles and the CNTs in the printing material mixture may be in a range of 60%-90% by weight to 40%40% by weight.

Meanwhile, in another aspect, the present disclosure is directed to a flexible strain sensor that includes a flexible substrate; a predetermined conductive line pattern directly printed on a surface of the flexible substrate; and a flexible cover covering and bonded to the surface of the flexible substrate on which the predetermined conductive line pattern is printed so that the predetermined conductive line pattern is sandwiched between the flexible cover and the flexible substrate. The predetermined conductive line pattern includes a plurality of linear conductive lines each of which extends linearly by a predetermined length in a first direction, and the plurality of linear conductive lines are arranged side by side to form a series connection while maintaining a predetermined distance between each other in a second direction perpendicular to the first direction. In addition, a cross-sectional structure of the plurality of linear conductive lines includes a seed layer, mechanically locked on the surface of the flexible substrate, formed by making the CNTs penetrate and fix into cracks formed on the surface of the flexible substrate; and a mixture layer of the metal nanoparticles and the CNTs formed by depositing the metal nanoparticles and the CNTs on the seed layer to have a predetermined width and height.

In an example embodiment, the flexible substrate and the flexible cover may have a same shore hardness of 10 to 70 based on shore A or have a same shore hardness of 22 or less based on shore D.

In an example embodiment, the flexible substrate and the flexible cover may be made from PDMS.

In an example embodiment, the mixing ratio between the metal nanoparticles and the CNTs in the mixture layer may be in a range of 60%-90% by weight to 40%-10% by weight.

According to the exemplary embodiments of the present disclosure, the material used for printing the conductive line on the flexible substrate is a powdery mixture in which only metal nanoparticles and CNTs are mixed and liquid chemicals such as solvents are not mixed at all. In printing using only metal nanoparticles, the metal nanoparticles jetted on the flexible substrate are not properly deposited on the surface of the flexible substrate and bounce off, so that desired printing cannot be achieved. However, if the composite nanomaterial mixed with metal nanoparticles and CNTs is used as the printing material, the composite nanomaterial can be directly printed with rigid adhesion on the surface of the flexible substrate.

While moving the flexible substrate at an appropriate speed along a desired conductive line pattern, the printing material mixture is mixed with the high-speed airflow and jetted onto the flexible substrate in an aerosolized state through a jetting nozzle. The metal nanoparticles and CNTs jetted at high impact speed can create cracks on the surface of the flexible substrate. At the same time, the CNTs penetrate into the cracks and are mechanically locked with the surface of the flexible substrate to form a solid seed layer between the flexible substrate and the CNTs. Then, the metal nanoparticles and CNTs are deposited on the seed layer, and the conductive line is directly printed on the flexible substrate.

As such, since the CNTs penetrate into the surface of the flexible substrate to make the seed layer mechanically firmly coupled with the flexible substrate, and then the metal nanoparticles and CNTs are deposited on the seed layer. The flexible substrate and the printed conductive line thereon can be very tightly coupled with each other. Accordingly, a very strong bond between the flexible substrate and the conductive line can be maintained for a long time despite frequent expansion and contraction of the flexible substrate.

In addition, the printing material mixture used in the present disclosure contains only powdery metal nanoparticles and CNTs without including a liquid organic solvent or a bonding resin. The printing mechanism for the flexible substrates is also completed by deposition by high-speed jetting. Therefore, there is no need for a separate chemical post-treatment or heat treatment after deposition by such high-speed jetting with impact. Thus, the manufacturing process is simple. Moreover, the printing process can be performed in a low pressure atmosphere and at room temperature. As such, the manufacturing cost can be reduced because the printing process is not complicated and the pressure and temperature requirements are not strict.

The present disclosure has a very excellent advantage in that the conductive line is composed of a mixture of metal nanoparticles and CNTs in terms of the characteristics of the strain sensor. If the conductive line is made of only metal nanoparticles, when the degree of deformation of the object to be measured is large, the metal nanoparticles that were electrically connected before the deformation may be electrically disconnected due to the large gap between them caused by the deformation. Accordingly, it is impossible to accurately measure the degree of deformation of the object to be measured. That is, if the conductive line is made using only metal nanoparticles, the range of measurable deformation is not large. In contrast, if the conductive line is made of a composite nanomaterial mixture of metal nanoparticles and CNTs as in the present disclosure, even when the degree of deformation of the object to be measured is large, the metal nanoparticles may have a large gap between them but the CNTs can be still connected with each other. Thus, the metal nanoparticles and the CNTs can maintain a state of being electrically connected to each other as a whole, and can function as a strain sensor. Therefore, the strain sensor made of the composite nanomaterial in which metal nanoparticles and CNTs are mixed can have a much wider measurable range compared to the strain sensor made of only metal nanoparticles.

DETAILED DESCRIPTION OF THE EMBODIMENTS

Hereinafter, preferred exemplary embodiments of the present disclosure will be described in more detail with reference to the accompanying drawings. The same reference numerals are used for the same components in the drawings, and repeated descriptions of the same components are omitted. The inventive concept may be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the sizes and relative sizes of layers and regions may be exaggerated for clarity. The same reference numerals refer to the same elements.

Although terms such as first, second, third, etc. may be used in this specification to describe various elements, it should be understood that these elements should not be limited by these terms. This term is used to distinguish one element from another. Accordingly, a first element discussed below may be referred to as a second element without departing from the teachings of the inventive concept. As used herein, the term "and/or" includes any and all combinations of one or more related listed items.

When an element is referred to as being "connected" or "coupled" to another element, it will be understood that the element may be directly connected or coupled to the other element, or intervening elements may be present. In contrast, when an element is referred to as being "directly connected" or "directly coupled" to another element, there is no intervening element. Other expressions used to describe the relationship between components should be interpreted in the same way (e.g., "between" versus "directly," "adjacent" versus "directly adjacent," etc.). In addition, the terminology used herein is for the purpose of describing specific exemplary embodiments, and is not intended to limit the concept of the present disclosure. As used herein, the singular forms "a", "an" and "the" are intended to include the plural forms unless the context dictates otherwise. The term "comprising," as used herein, refers to the presence of a specified feature, integer, step, operation, component, and/or component, but It will be understood that this does not exclude the presence or addition of one or more other features, integers, steps, operations, elements, components and/or groups thereof.

Figure 1:
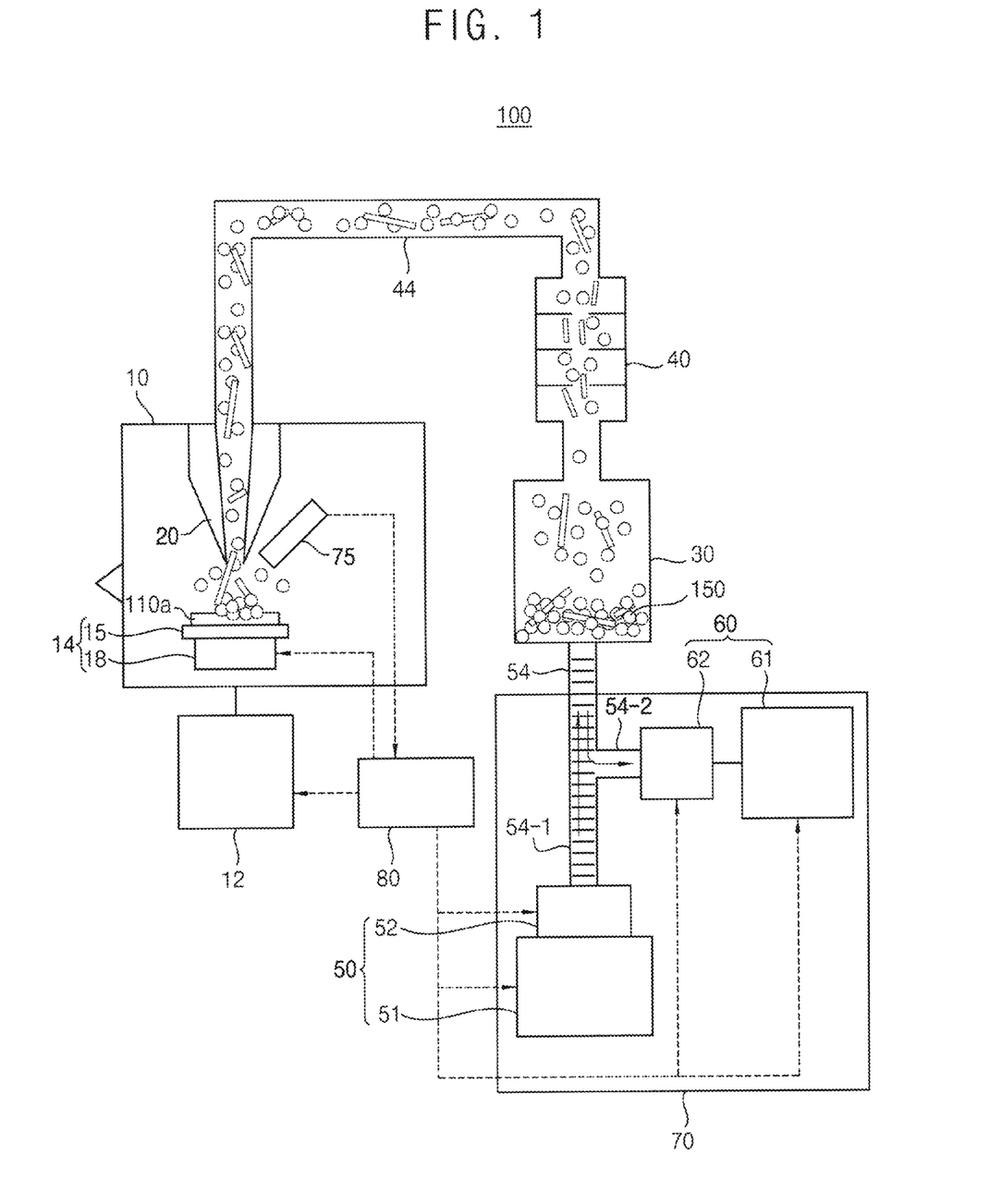
FIG. 1 illustrates a configuration of a strain sensor manufacturing apparatus according to an example embodiment of the present disclosure.

FIG. 1 illustrates a configuration of a strain sensor manufacturing apparatus 100 according to an example embodiment of the present disclosure.

Referring to FIG. 1, the strain sensor manufacturing apparatus 100 may include a working chamber 10, a first pressure control unit 12, a movable stage 14, a nozzle 20, a printing material tank 30, and a first communication pipe 44, a second pressure control unit 70, and a second communication pipe 54.

The working chamber 10 may provide a working space for printing a conductive line 160 of a strain sensor 200 on the surface of a flexible substrate 110a. The nozzle 20 may be installed on the upper inside of the working chamber 10, and the movable stage 14 may be installed on the lower side thereof.

The movable stage 14 may include a stage 15 and a stage driving unit 18. The stage 15 may have a plate structure on which the flexible substrate 110a is placed and supported. The stage driving unit 18 may move the stage 15 according to a motion control signal for position movement or control the position movement as well as the change of the angle with respect to the horizontal plane. That is, the stage driving unit 18 may be configured to move the stage 15 at a desired speed along a desired path on a two-dimensional plane or in a three-dimensional space, or to control an inclination angle with respect to a horizontal plane along with such movement. According to an exemplary embodiment, the stage driving unit 18 may adopt, for example, a linear guide structure capable of 3-axis control for the stage driving unit 18. Furthermore, a ball joint may be mounted on the center of the bottom surface of the stage 15, and a plurality of cylinders or an expansion and contraction member capable of length adjustment may be mounted on the edge of the bottom surface of the stage 15, so that operations for the inclination control and rotation in all directions of the stage 15 can be made. By this configuration, it will be possible to implement various lamination states of a printing material mixture 150 on the surface of the flexible substrate 110a.

The nozzle 20 may be fixed to the ceiling of the working chamber 10, and the nozzle outlet through which the printing material mixture 150 is jetted out may be installed to face the upper surface of the movable stage 14. The nozzle 20 may be configured as a converging nozzle or a capillary nozzle without a cross-sectional change. The nozzle 20 may be aerodynamically focused on the surface of the flexible substrate 110a to jet the powder of the printing material mixture 150 in a concentrated state. The outlet diameter of the nozzle 20 may have a size of approximately 10 µm to several mm.

The flexible substrate 110a, which is the object to be printed, may be made of a material having good elasticity and flexibility of which physical properties are not hard but soft. According to an exemplary embodiment, the flexible substrate 110a may be made using a material having a shore hardness of 10 or more and 70 or less (i.e., hardness classified as extra-soft or soft) based on shore A or a shore hardness of 22 or less based on shore D. A representative material having such hardness characteristics may be PDMS. That is, a substrate made of PDMS may be cut to a desired size and used as the flexible substrate 110a to be printed.

The inside of the working chamber 10 needs to maintain a negative pressure (e.g., about 1 torr to 10 torr) atmosphere lower than normal pressure while the printing operation is being performed. The working chamber 10 may be provided with the first pressure control unit 12 capable of controlling the internal pressure of the working chamber 10. The first pressure control unit 12 may be configured to connect a first vacuum pump, such as a rotary suction pump, with the working chamber 10 to discharge air from the working chamber to the outside. The first pressure control unit 12 may draw out the air inside the working chamber 10 to the outside, and form a relatively low pressure atmosphere with its internal pressure compared to the printing material tank 30.

The printing material tank 30 may provide an internal space to contain a mixture, which is referred to as 'printing material mixture' 150, of conductive nanoparticles 152 and CNTs 154. The printing material tank 30 may be configured to discharge printing material mixture 150 through the upper outlet by the high-pressure air flow applied through the lower inlet.

The printing material tank 30 may communicate with the nozzle 20 in the working chamber 10 through the first communication pipe 44 connected to the upper through-hole. The first communication pipe 44 is a passage through which the printing material mixture 150 discharged from the printing material tank 30 is forcibly transferred to the nozzle 20.

An aerodynamic filter 40 may be further installed in a predetermined section of the first communication pipe 44. The aerodynamic filter 40 may control the amount of particles of the printing material mixture 150 transferred from the printing material tank 30 to the working chamber 10.

The printing material tank 30 may also be connected to the second pressure control unit 70 through the second communication pipe 54 coupled to a lower through hole. The second pressure control unit 70 may include a pressurizing unit 50 and a purging unit 60. The second communication pipe 54 may be branched into a second-1 communication pipe 54-1 and a second-2 communication pipe 54-2 and connected to the pressurizing unit 50 and the purging unit 60, respectively.

The pressurizing unit 50 may be to provide a high-pressure air flow to the printing material tank 30 to form a high-pressure atmosphere in the lower inlet side compared to that in the upper outlet side of the printing material tank 30. This high-pressure atmosphere may be relatively high-pressure compared to the pressure in the working chamber 10. The pressurizing unit 50 may include an air compressor 51 for generating compressed air and providing it to the printing material tank 30, and a flow control valve 52, disposed in the second-1 communication pipe 54-1, for controlling the pressure applied to the inlet of the printing material tank 30 by controlling the amount of air, which is compressed by the air compressor 51, supplied to the printing material tank 30. The flow control valve 52 may be configured using a kind of solenoid valve capable of appropriately controlling the pressure of the applied air according to the degree of opening and closing. Whether the air compressor 51 is operated and the opening and closing of the flow control valve 52 may be controlled by a control unit 80.

Figure 2:
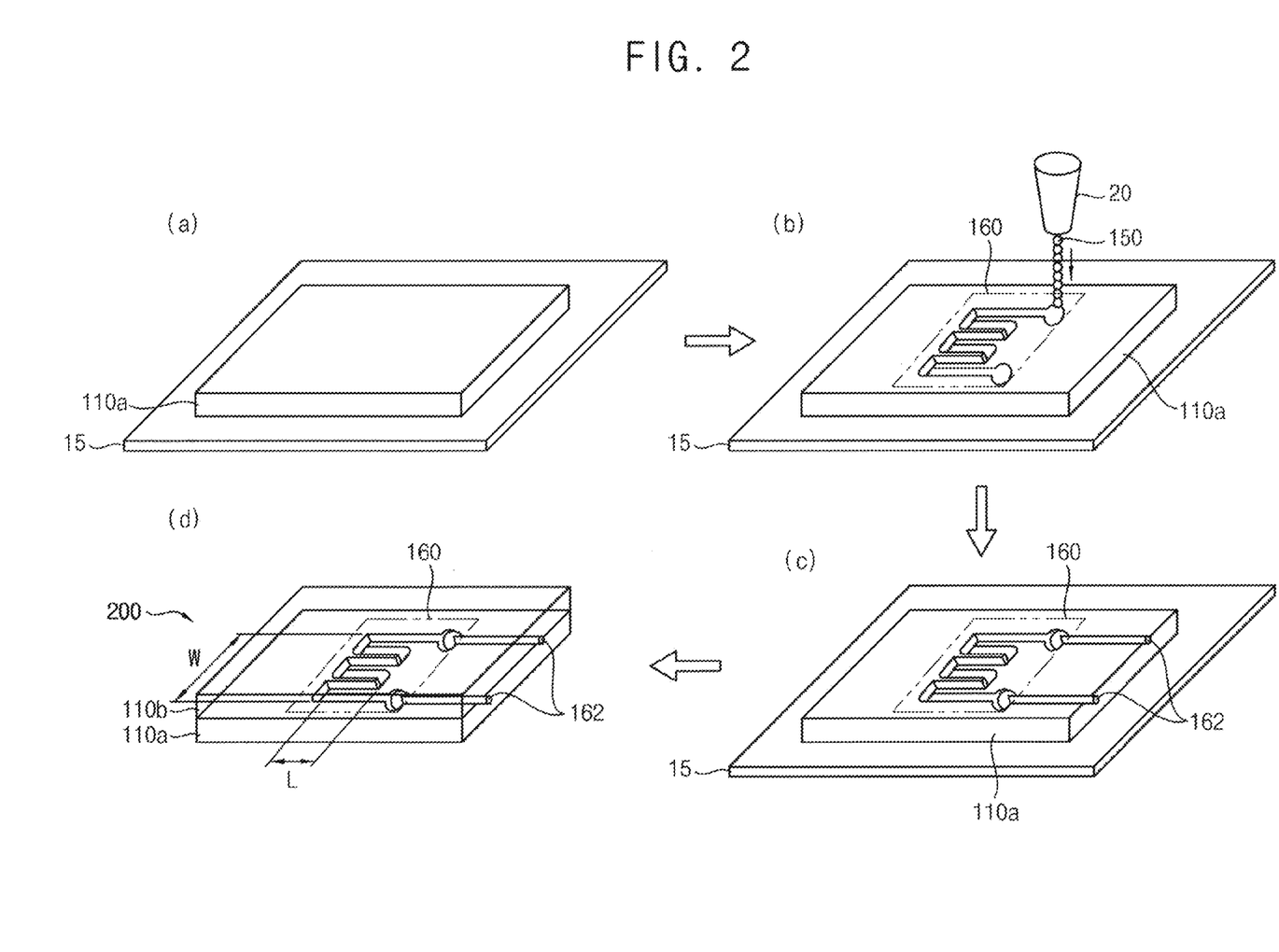
FIG. 2 shows a process of manufacturing a strain sensor by directly printing a conductive line for a strain sensor on the surface of a flexible substrate using an aerosolized mixture of metal nanoparticles and CNTs according to an example embodiment of the present disclosure.

After the printing operation of the printing material mixture 150 on the flexible substrate 110a is completed, the printing material mixture 150 may remain in the working chamber 10, the first communication pipe 44, the filter aerodynamic 40, etc. The purging unit 60 is a means for returning the transport gas mixed in the aerosolized printing material mixture 150 remaining in the working chamber 10, the filter 40, the first communication pipe 44, etc. to the outside of the printing material tank 30 after the printing operation on the flexible substrate 110*a* is completed. For the returning of the remaining printing material mixture 150, the purging unit 60 sucks air from the printing material tank 30 to make the inside of the printing material tank 30 a relatively low pressure atmosphere compared to the working chamber 10. The purging unit 60 may include a second vacuum pump 61 for sucking air from the lower side of the printing material tank 30 through the second communication pipe 54 and discharging the air it outside, and a purge valve 62, disposed in the second-2 communication pipe 54-2, for controlling the intake air amount of the second vacuum pump 61. Whether the second vacuum pump 61 should be operated and whether the purge valve 62 should be opened or closed may also be controlled by the control unit 80. Here, the intensity of the suction force of the second vacuum pump 61 may be greater than the intensity of the suction force of the first pressure control unit 12 like a first vacuum pump in order not to interfere with the suction of the printing material mixture 150 remaining in the working chamber 10 and the first communication pipe 44 and the aerodynamic filter 40.

The pressurizing unit 50 and the purging unit 60 may be configured to operate alternatively. That is, while the pressurizing unit 50 operates, the purging unit 60 may not operate, and conversely, the pressurizing unit 50 may not operate while the purging unit 60 operates. In this way, stopping the air intake by the purging unit 60 and supplying the compressed air to the printing material tank 30 by the pressurizing unit 50 can be made at the same time. In addition, blocking the compressed air supply by the pressurizing unit 50 and sucking air from the printing material tank 30 by operating the purging unit 60 may be made at the same time. The transfer of the printing material mixture 150 to the working chamber 10 and the return of the printing material mixture 150 from the working chamber 10 can be instantaneously and rapidly and continuously. Such operation control of the pressurizing unit 50 and the purging unit 60 may be controlled by the control unit 80.

According to an exemplary embodiment, the strain sensor manufacturing apparatus 100 may further include a monitoring unit 75 and the control unit 80.

The monitoring unit 75 may be built in the working chamber 10 to monitor in real time a state in which the printing material mixture 150 is jetted and laminated on the flexible substrate 110*a*. The monitoring unit 75 may be configured with, for example, an optical microscope or an electron scan microscope.

The control unit 80 may be electrically connected to the pressurizing unit 50, the purging unit 60, and the monitoring unit 75, respectively. It may be possible to control the start and stop of the operations of the pressurizing unit 50 and the purging unit 60, respectively, based on image information obtained from the monitoring unit 75. The control unit 80 may also be electrically connected to the first pressure control unit 12 to control its operation.

The control unit 80 may also be electrically connected to the stage driving unit 18 to control the movement of the stage driving unit 18. Based on the pattern of the conductive line 160 to be printed, information on the path along which the stage driving unit 18 should move may be preset in the control unit 80. The stage driving unit 18 may perform a movement according to a movement control signal provided by the control unit 80. The control unit 80 may control the stage driving unit 18 to control the distance between the flexible substrate 110*a* and the nozzle 20. When the printing material mixture 150 is jetted through the nozzle 20 in an aerosolized state, the printing material mixture 150 may be aerodynamically focused by adjusting the spacing to focus on the surface of the flexible substrate 110*a* and be jetted accordingly.

The control unit 80 may integrally control various operations such as the operation and stop of the pressurizing unit 50, the operation and stop of the purging unit 60, the operation of the first pressure control unit 12, and the movement speed of the stage driving unit 18 based on the image information obtained from the monitoring unit 75. The control unit 80 may include programs for performing such control, a memory device capable of storing and executing the programs, and a processor.

According to an exemplary embodiment, the printing material mixture 150 may be a composite nanomaterial in which conductive nanoparticles 152 and CNTs 154 are mixed. The conductive nanoparticles 152 may be, for example, nano-sized metal particles. A representative example of the metal nanoparticles may be silver (Ag) nanoparticles (AgNPs) having excellent conductivity. Instead of silver, conductive nanoparticles made of other metals such as copper, gold, platinum, nickel, aluminum, titanium, etc. may be used. The conductive nanoparticles 152 may have a diameter in the range of several nanometers to several tens of micrometers.

The CNTs 154 may be single-wall CNTs (SWCNTs) or multi-wall CNTs (MWCNTs). MWCNTs may have better bonding with metal nanoparticles than SWCNTs.

The mixing ratio of the conductive nanoparticles (i.e., metal nanoparticles) 152 and the CNTs 154 constituting the printing material mixture 150 may be in the range of 60%-90% by weight to 40%-10% by weight. If the metal nanoparticles 152 are less than 60% by weight, it may be difficult to obtain a desired level of conductive properties. If more than 90% by weight, the CNTs 154 are insufficient, so that the lamination on the flexible substrate 110*a* may not be effectively performed. Within the above mixing ratio range, an appropriate value can be set according to the application target. That is, within the mixing ratio range, in the application field where the sensitivity is more important than the measurable range, it is preferable that the printing material mixture 150 is made so as to contain a lot more metal nanoparticles 152 compared to normal mixture, and on the contrary, in the application field where the measurable range is more important than the sensitivity, it is preferable that the printing material mixture 150 is made so as to contain a lot more CNTs 154 compared to normal mixture.

FIG. 2 shows a process of manufacturing the strain sensor 200 by directly printing the conductive line for the strain sensor on the surface of the flexible substrate 110*a* with aerosolizing the printing material mixture 150 of metal nanoparticles and CNTs according to an exemplary embodiment.

Referring to FIG. 2, first, the flexible substrate 110*a* may be positioned on the stage 15 in the working chamber 10. In this state, the nozzle 20 may be located directly above the flexible substrate 110*a* placed on the stage 15, and its outlet faces the upper surface of the flexible substrate 110*a* (refer to (a) of FIG. 2).

The stage driving unit 18 may drive the stage 15 so that the outlet of the nozzle 20 can relatively move along the pattern of the conductive line 160 of the strain sensor 200.

While the exit of the nozzle 20 is moving relative to the stage 15, the printing material mixture 150 may be jetted in an aerosolized state through the exit of the nozzle 20. Accordingly, the conductive line 160 of the strain sensor 200 may be directly printed on the surface of the flexible substrate 110*a* (refer to (b) of FIG. 2).

The conductive line 160 of the strain sensor 200 may be, for example, long and thin conductive strips arranged in parallel in a zigzag pattern to form a series connection. The resultant conductive line 160 may have a pattern similar to a waveform in which rectangular pulse waves are connected. The conductive line 160 may be called a measuring grid. The length (L) and width (W) of the measuring grid may be set to various sizes according to the application target.

After the direct printing of the conductive line 160 on the flexible substrate 110*a* is completed, lead wires 162 may be connected to both ends of the conductive line 160 to extend outside the flexible substrate 110*a* (refer to (c) of FIG. 2). The lead wires 162 may be connected in such a way that a separate strip line-shaped conductor is connected to the conductive line 160 outside the working chamber 10.

After the conductive line 160 and the lead wires 162 are connected, these may be covered with a flexible cover 110*b* to be bonded to the flexible substrate 110*a*. Accordingly, the conductive line 160 and the lead wires 162 may be sandwiched between the flexible substrate 110*a* and the flexible cover 110*b* (refer to (d) of FIG. 2). The flexible cover 110*b* may be made of the same material as the above-mentioned flexible substrate 110*a*.

Next, FIGS. 3 to 6 show the principle that the printing material mixture 150 of metal nanoparticles 152 and CNTs 154 is directly printed on the flexible substrate 110*a* and a sequential printing process (the process corresponding to (b) of FIG. 2) according to an embodiment of the present disclosure are conceptually shown. Hereinafter, the manufacturing process will be described in detail with further reference to these drawings.

First, the printing material may be prepared. To this end, the printing material mixture 150 in a powder state in which the metal nanoparticles 152 and the CNTs 154 are mixed is fed into the printing material tank 30.

An object to be printed may be prepared. To this end, the flexible substrate 110*a* may be placed on the stage 15 that is movable by the stage driving unit 18.

In order to print the printing material mixture 150 on the flexible substrate 110*a* in the state in which the work preparation is made, the control unit 80 may provide a driving control signal to the first pressure control unit 12 to operate the first pressure control unit 12. As the first pressure control unit 12 is operated, the pressure inside the working chamber 10 may be lowered. The control unit 80 may control the internal pressure of the working chamber 10 to be maintained at a predetermined level of negative pressure. The pressure inside the working chamber 10 may be maintained, for example, about 1 torr to 10 torr. In addition, during the printing process, the inside of the working chamber 10 may be maintained at a room temperature level.

In parallel with this, the control unit 80 may operate the pressurizing unit 50 of the second pressure control unit 70 to form a high-pressure atmosphere higher than the internal pressure of the working chamber 10 at the lower inlet of the printing material tank 30. That is, the flow control valve 52 may be opened while operating the air compressor 51 to create high-pressure compressed air. At the same time, the control unit 80 may control the purging unit 60 not to operate. That is, the purge valve 62 is controlled to close without operating the second vacuum pump 61. Accordingly, a pressure difference between the high pressure at the bottom of the printing material tank 30 and the low pressure inside the working chamber 10 may occur, and the printing material mixture 150 in the printing material tank 30 may be excited by the pressure difference into an aerosol state (excitation) and aerodynamically transferred to the nozzle 20 to be jetted out.

Specifically, the high-pressure compressed air generated by the air compressor 51 may be delivered to the lower inlet of the printing material tank 30 through the second communication pipe 54 by opening the flow control valve 52. Accordingly, a high pressure (HP) may be applied to the lower inlet of the printing material tank 30. In contrast, a relatively low pressure lower than the normal pressure is formed inside the working chamber 10 by the operation of the first pressure control unit 12. The outlet of the nozzle 20 may have substantially the same pressure as the internal pressure of the working chamber 10. Therefore, a pressure difference may occur between the lower inlet of the printing material tank 30 and the outlet of the nozzle 20. Due to the pressure difference, a high-speed airflow from the printing material tank 30 to the nozzle 20 through the first communication pipe 44 may be generated in the form of a shock wave (or compression wave). A high-speed airflow may be generated by the formed shock wave, and the printing material mixture 150 contained in the printing material tank 30 may be excited to an aerosolized state while being mixed with the high-speed airflow and dispersed.

When the flow control valve 52 is closed, the powder of the printing material mixture 150, which is mixed into the high-speed airflow, being excited in the printing material tank 30 and soaring upward, may return to its initial state by gravity. However, there may be a transfer gas (combination of air and printing material mixture) remaining in the inside of the printing material tank 30 and the first communication pipe 44 between the opening and closing time points of the flow control valve 52. When the residual transport gas is injected into the nozzle 20 in excess, it may cause undesired printing. In order to prevent the powder of the aerosolized printing material mixture 150 from being excessively injected into the nozzle 20 by stabilizing it, the control unit 80 may purge the excited printing material mixture 150. That is, while stopping the operation of the air compressor 51 and closing the flow control valve 52, opening the purge valve 62 may be done while operating the second vacuum pump 61 of the purging unit 60. Thereby, the printing material mixture 150 in the excited state in the printing material tank 30 and the first communication pipe 44 can be purged and returned to the purging unit 60.

In this way, by pumping the printing material mixture 150 while appropriately controlling times of the excitation operation and the purging operation, the printing material mixture 150 may be aerosolized, and sent out of the upper outlet of the printing material tank 30 to be forcibly transferred to the nozzle 20 through the aerodynamic filter 40 and the first communication pipe 44. When the printing material mixture 150 is excited, according to Stokes' law, small-sized particles or low-density particles are first accelerated by the transport gas. The printing material mixture 150 in an aerosol state, which is carried in a high-speed air stream and forcibly transported through the first communication pipe 44, is aerodynamically focused in the nozzle 20 and may be jetted out through the outlet of the nozzle 20.

While the printing material mixture 150 is jetted out through the nozzle 20, the control unit 80 may provide a predetermined motion control signal to the stage driving unit 18 to control the stage 15 to move at a desired speed along the path corresponding to a predetermined strain sensor circuit pattern. Through such movement control of the movable stage 14, the flexible substrate 110a can also move along a path corresponding to the pattern of the conductive line 160 of the strain sensor 200. The monitoring unit 75 may monitor size (height and width) information of the printing material mixture 150 deposited on the surface of the flexible substrate 110a and provide the monitored size information to the control unit 80. The control unit 80 may perform the above motion control based on the information provided by the monitoring unit 75.

The control unit 80 may also adjust the interval between the flexible substrate 110a and the nozzle 20 by controlling the stage driving unit 18 so that the printing material mixture 150 can be jetted out in a state in which the printing material mixture 150 is accurately focused on the surface of the flexible substrate 110a. The printing material mixture 150 may be jetted through the nozzle 20 in an aerosolized state. At this time, the desired conductive line pattern can be precisely printed only when the printing material mixture 150 is aerodynamically focused to make a good focus on the surface of the flexible substrate 110a. To this end, the control unit 80 may adjust the distance between the flexible substrate 110a and the nozzle 20.

While the flexible substrate 110a moves in the working chamber 10, the printing material mixture 150 jetted out through the nozzle 20 collides with the surface of the flexible substrate 110a placed on the stage 15 at high speed. Due to this collision, cracks with random shapes may be formed on the surface of the flexible substrate 110a. The collision of the metal nanoparticles 152 greatly contributes to the formation of cracks. The CNTs 154 of the printing material mixture 150 may penetrate into the cracks to mechanically create a locking structure on the surface of the flexible substrate 110a. Accordingly, the CNTs 154 may form a very strong bond with the surface of the flexible substrate 110a. The locking structure may serve as a seed layer upon which the printing material mixture 150 subsequently jetted thereon may be deposited. Accordingly, the printing material mixture 150 may be deposited on the surface of the flexible substrate 110a to have a desired width and height, so that the conductive line 160 of the strain sensor having a desired pattern can be directly printed.

The principle in which the printing material mixture 150 is directly printed in the form of being deposited on the surface of the flexible substrate 110a will be described in more detail.

Figure 3:
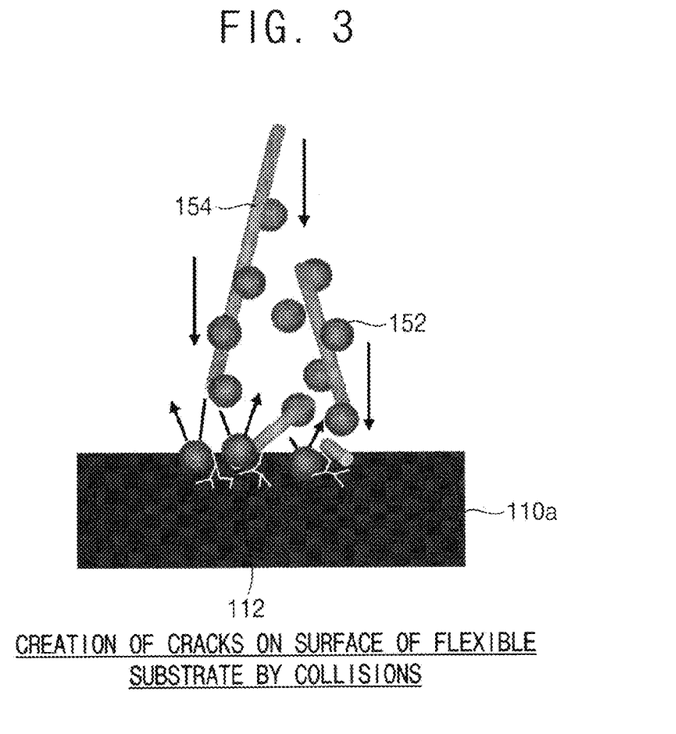
FIGS. 3 to 6 conceptually illustrate a principle of directly printing the mixture of metal nanoparticles and CNTs on the flexible substrate and a sequential printing process according to an example embodiment of the present disclosure.

FIG. 3 shows a state in which the printing material mixture 150 jetted out from the nozzle 20 in an aerosol state collides with the surface of the flexible substrate 110a. As shown in FIG. 3, the printing material mixture 150 jetted out in an aerosol state from the nozzle 20 may collide with the flexible substrate 110a at a very high impact speed while being aerodynamically focused. The impact speed may be as high as, for example, about 200 m/s. By this high impact speed jetting, the metal nanoparticles 152 and the CNTs 154 constituting the printing material mixture 150 may have high kinetic energy. The printing material mixture 150 having such high kinetic energy may create cracks 112 of arbitrary shapes while collided with the surface of the flexible substrate 110a.

If the printing material mixture consists only of metal nanoparticles without containing CNTs, the metal nanoparticles can make cracks on the surface of the flexible substrate 110a while they collide with the flexible substrate 110a at the high impact speed. However, there is a strong tendency that the metal nanoparticles rebound from the flexible substrate 110a rather than grow as they continue to be deposited thereon. Accordingly, there is a problem that the metal nanoparticles are not effectively printed on the surface of the flexible substrate 110a.

However, this problem can be solved by using the composite nanomaterial in which CNTs are mixed with metal nanoparticles as a printing raw material according to the embodiment of present disclosure. That is, in the initial stage of the collision, the metal nanoparticles 152 may significantly contribute to making cracks 112 on the surface of the flexible substrate 110a. Once the cracks 112 are formed on the surface of the flexible substrate 10, then the CNTs 154 can dig into the cracks 112 and be firmly fixed to be mechanically locked with the flexible substrate 110a.

Figure 4:
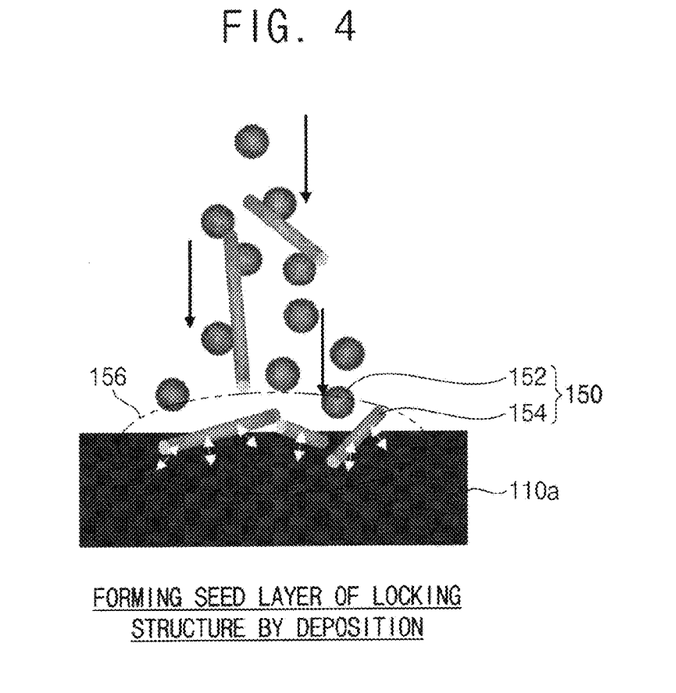

Accordingly, as shown in FIG. 4, a mechanical locking structure may be formed between the CNTs 154 and the flexible substrate 110a. That is, a CNT layer 156 firmly rooted in the surface of the flexible substrate 110a may be formed by this locking structure. The CNT layer 156 of this locking structure may serve as a seed layer 156 to allow the subsequently incident metal nanoparticles 152 to be firmly deposited on the flexible substrate 110a.

Figure 5:
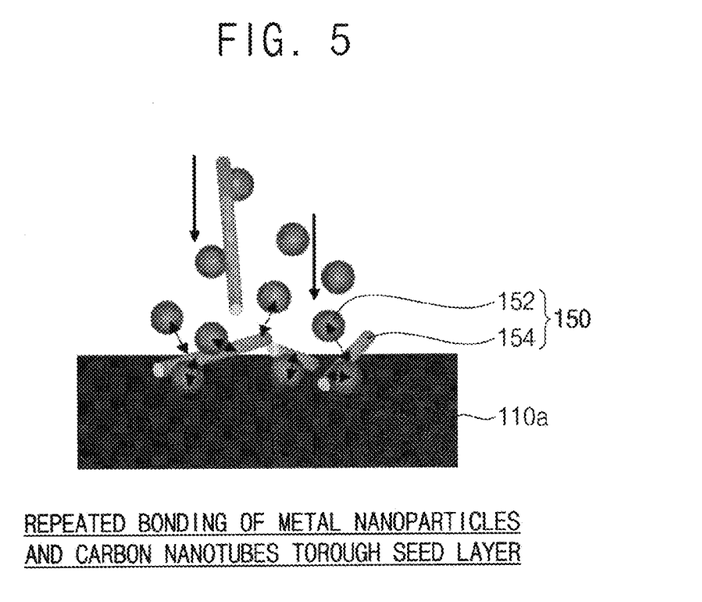

As the printing material mixture 150 is continuously incident on the seed layer 156 initially made by the CNTs 154, the seed layer 156 may continue to combine with the CNTs 154 and the metal nanoparticles 152 and grow larger as shown in FIG. 5. That is, the CNTs 154 of the seed layer 156 may hold the metal nanoparticles 152 penetrating therein, and may also form a bond with the incident CNTs. Accordingly, the rebound of the metal nanoparticles 152 is suppressed as much as possible, and strong bonding can be made between the CNTs 154 and the metal nanoparticles 152.

This bonding process may be repeated. That is, the CNTs 154 and metal nanoparticles 152 deposited on the surface of the flexible substrate 110a may form a locking structure with the CNTs 154 colliding thereon, and the metal nanoparticles 152 may combine with the locking structure by penetrating into the locking structure. Through such reciprocal bonding, direct printing on the flexible substrate 110a, which was previously impossible with only metal nanoparticles, becomes possible.

Figure 6:
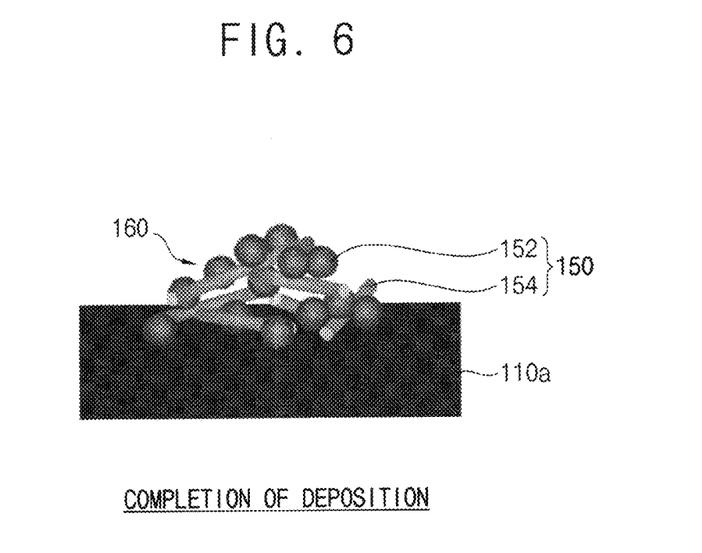

The printing material mixture 150 may exhibit various deposition states according to the degree of opening and closing the flow control valve 52 of the pressurizing unit 50. The deposition state may be monitored in real time through the monitoring unit 75 in the working chamber 10. According to the opening time and closing time of the flow control valve 52, the amount of aerosol fed from the printing material tank 30 to the nozzle 20 can be controlled. Accordingly, the pattern size of the conductive line 160 printed on the flexible substrate 110a may be controlled. If the amount of aerosol fed from the printing material tank 30 to the nozzle 20 can be controlled to be as minimal as possible, the size of the conductive line pattern printed on the flexible substrate 110a can be reduced and a sophisticated pattern can be printed. Accordingly, by varying the time interval between the opening and closing time points of the flow control valve 52, the size of the conductive line pattern printed on the flexible substrate 110a, that is, the height and width of the conductive line pattern printed may also be diversified. Such control may be performed by the control unit 80. By controlling the movement speed of the flexible substrate 110a and the jetting amount of the printing material mixture 150 per unit time, the layer of the conductive line 160 may be grown to a desired width and height on the surface of the flexible substrate 110a. FIG. 6 conceptually illustrates the conductive line 160, as an example, completely deposited to a desired width and height by the direct-printing on the surface of the flexible substrate 110a.

Figure 7:
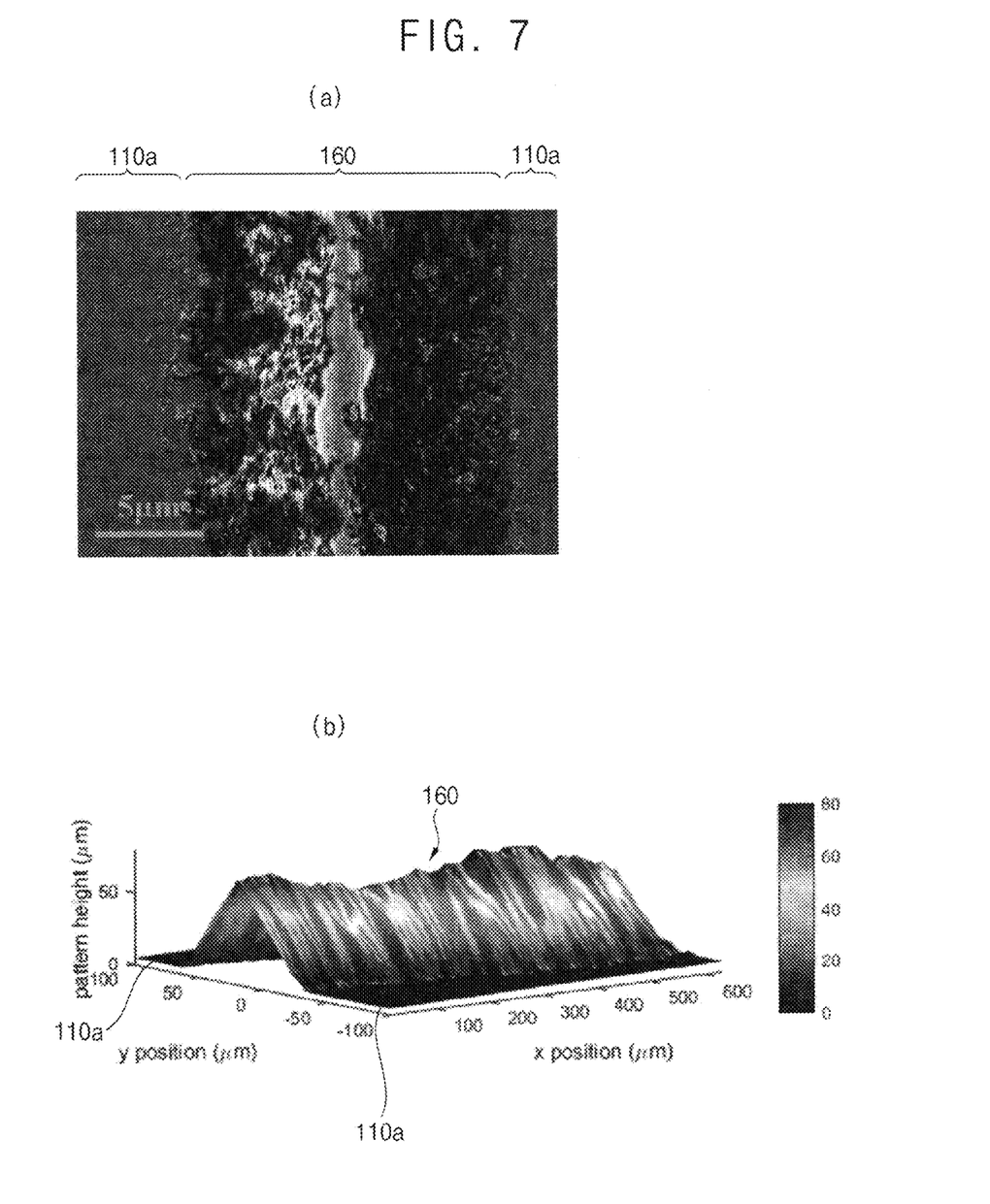
FIG. 7 illustrates images, which are captured by a scanning electron microscope and a confocal microscope, of a layer of the mixture of metal nanoparticles and CNTs deposited by the direct-printing method on the flexible substrate according to an embodiment of the present disclosure.

For a test, the present inventors actually fabricated the strain sensor. After preparing the printing material mixture 150 by mixing silver nanoparticles (AgNPs) and MWCNTs, the conductive line 160 for the strain sensor was printed on a PDMS substrate as the flexible substrate 110a by the strain sensor manufacturing apparatus 100 of FIG. 1. FIG. 7 illustrates an image (a), which is captured by a scanning electron microscope, and a confocal microscope image (b) of the conductive line 160 actually printed on the flexible substrate 110a by direct-printing of a mixture of AgNPs and MWCNTs. Referring to the image (a) of FIG. 7, it can be seen that the vertical cross-section of the conductive line 160 has a substantially triangular shape, and is firmly deposited on the surface of the flexible substrate 110a with almost uniform width and height.

TABLE 1

| | Substrate/Material | AgNP | AgNP/MWCNT |
|---|---|---|---|
| | PET | O | X |
| | Polyimide | O | X |
| | Silicon | O | X |
| | CFRP | O | Δ |
| | GFRP | O | Δ |
| PDMS | Sylgard184 ™ | X | O |
| | EcoFlex ™ | X | O |

<X: No deposition, Δ: Powder attachment (No pattern), O: Pattern deposition>

In manufacturing the strain sensor 200 by the direct-printing method according to the present disclosure, the characteristics of the substrate used for printing and the printing nanomaterial may be important factors influencing the printing performance. Table 1 shows the printing performance according to the types of nanomaterials and substrates for printing.

First, when only AgNPs was used as the printing nanomaterial for the high impact speed jetting through the nozzle 20, the AgNPs were deposited well on a substrate made of PET film or polyimide film, a silicon substrate, or a substrate made of a relatively rigid material such as a carbon fiber-reinforced plastic (CFRP) or glass fiber reinforced plastics (GFRP).

On the other hand, when the mixture of AgNPs and MWCNTs was used as the printing nanomaterial for the high impact speed jetting, the mixture was not well deposited on the substrate made of PET film or polyimide film, or the silicon substrate and there was a phenomenon that the mixture was broken due to the impact force caused by the high impact speed collision against the substrate. In other words, MWCNTs were not properly deposited on the hard substrate because they had a property of being brittle unlike AgNPs when they collided with a rigid substrate at high impact speed because they had an elongated shape compared to the diameter. For the CFRP or GFRP substrate, the mixture of AgNPs and MWCNTs was partially deposited only in the hollow between the fibers.

However, when a flexible substrate with low hardness such as the PDMS substrate was used, different results were obtained. Specifically, when the high impact speed jetting was performed using only AgNPs as a printing nanomaterial, AgNPs were not deposited properly and bounced off due to the stretchable or elastic properties of the PDMS substrate. On the other hand, when the high impact speed jetting was performed using the mixture of AgNPs and MWCNTs as a printing nanomaterial, it was well deposited on the PDMS substrate and a desired conductive line was printed.

In this way, when the mixture of AgNPs and MWCNTs is used as a printing material for jetting out at a high impact speed, they collides with the surface of the PDMS substrate to create cracks initially on the surface of the PDMS substrate, and form the locking structure while the MWCNTs mechanically locks the surface of the substrate where the cracks are formed. As the locking structure acts as a seed layer, the mixture of AgNPs and MWCNTs jetted onto the seed layer can be well deposited. The printing method according to the present disclosure performs direct printing using a powder state without adding a solvent to the printing material under a low pressure condition close to normal pressure at room temperature. Therefore, it is eco-friendly because it does not require a separate chemical post-treatment process or heat treatment process for removing the solvent after printing.

The printing method according to the embodiment according to the present disclosure is a process that can directly print various inorganic materials on flexible substrates without chemical reaction or heat treatment process. The direct printing process is particularly effective for printing micro-scale patterns. In particular, there is an advantage in that a porous structure having a micro-scale can be printed without design limitation. In addition, the limitations of traditional processes such as laser processing can be overcome because the printing pattern can be modified as needed.

Figure 8:
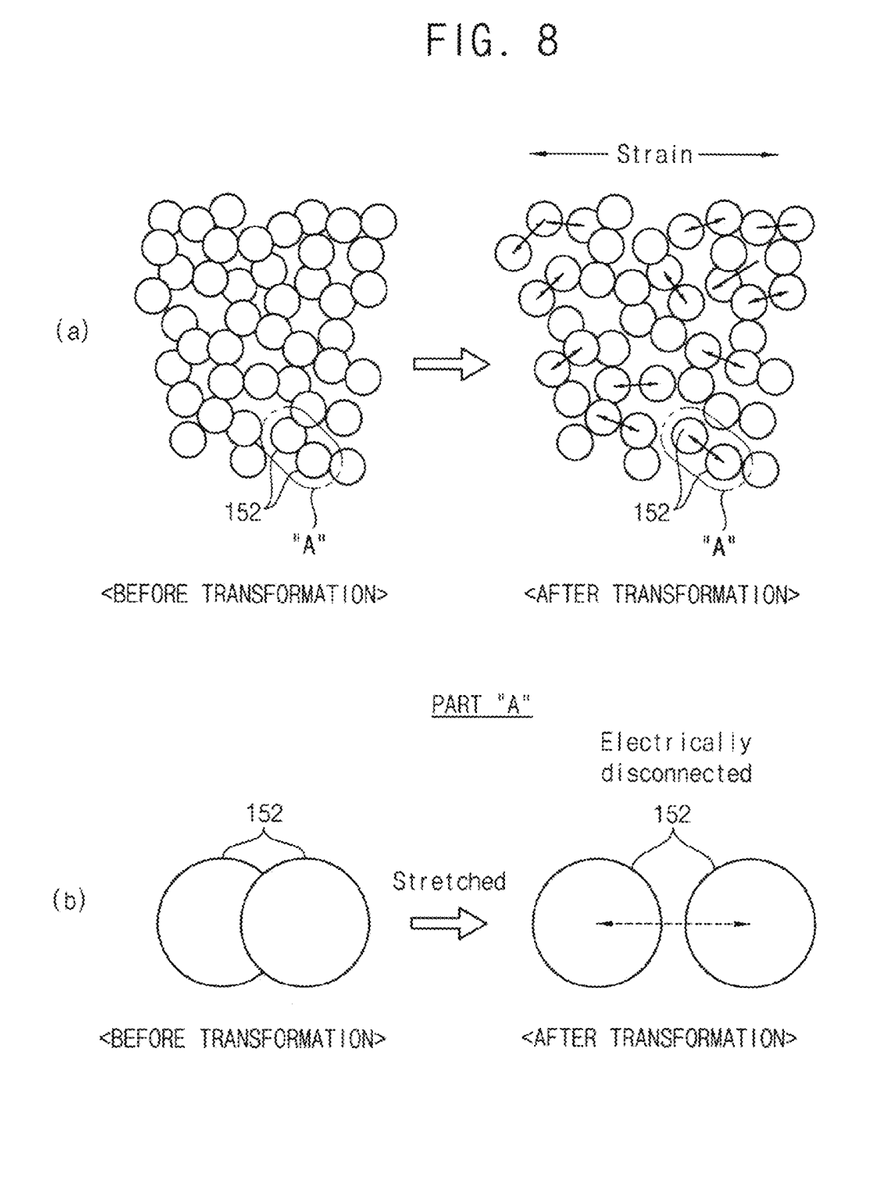
FIG. 8 illustrates a case in which a large deformation force is applied to a conductive line of the strain sensor made of only metal nanoparticles, resulting in an electrical disconnection between the metal nanoparticles.

Meanwhile, FIG. 8 shows a case in which a large deformation force is applied to a conductive line of the strain sensor made of only metal nanoparticles, resulting in an electrical disconnection between the metal nanoparticles. In contrast, FIG. 9 shows a state in which when the conductive line of the strain sensor is composed of the nanomaterial mixture of metal nanoparticles and CNTs according to the present disclosure, the metal nanoparticles and the CNTs are still electrically connected even when a large deformation force is applied is maintained.

Referring to FIG. 8, in the strain sensor of which conductive line is printed using only metal nanoparticles, when a strain is applied to the conductive line through the flexible substrate due to the deformation of an object to be measured, electrical connection between the metal nanoparticles 152 is broken, resulting in a sudden and large change in resistance of the conductive line. In such a state, the magnitude of the strain cannot be accurately measured. For this reason, when the conductive line of the strain sensor is composed of only the metal nanoparticles 152, the measurable range is inevitably narrow. Although the measurement sensitivity may be high, there is a disadvantage that the measurable range is not wide.

Figure 9:
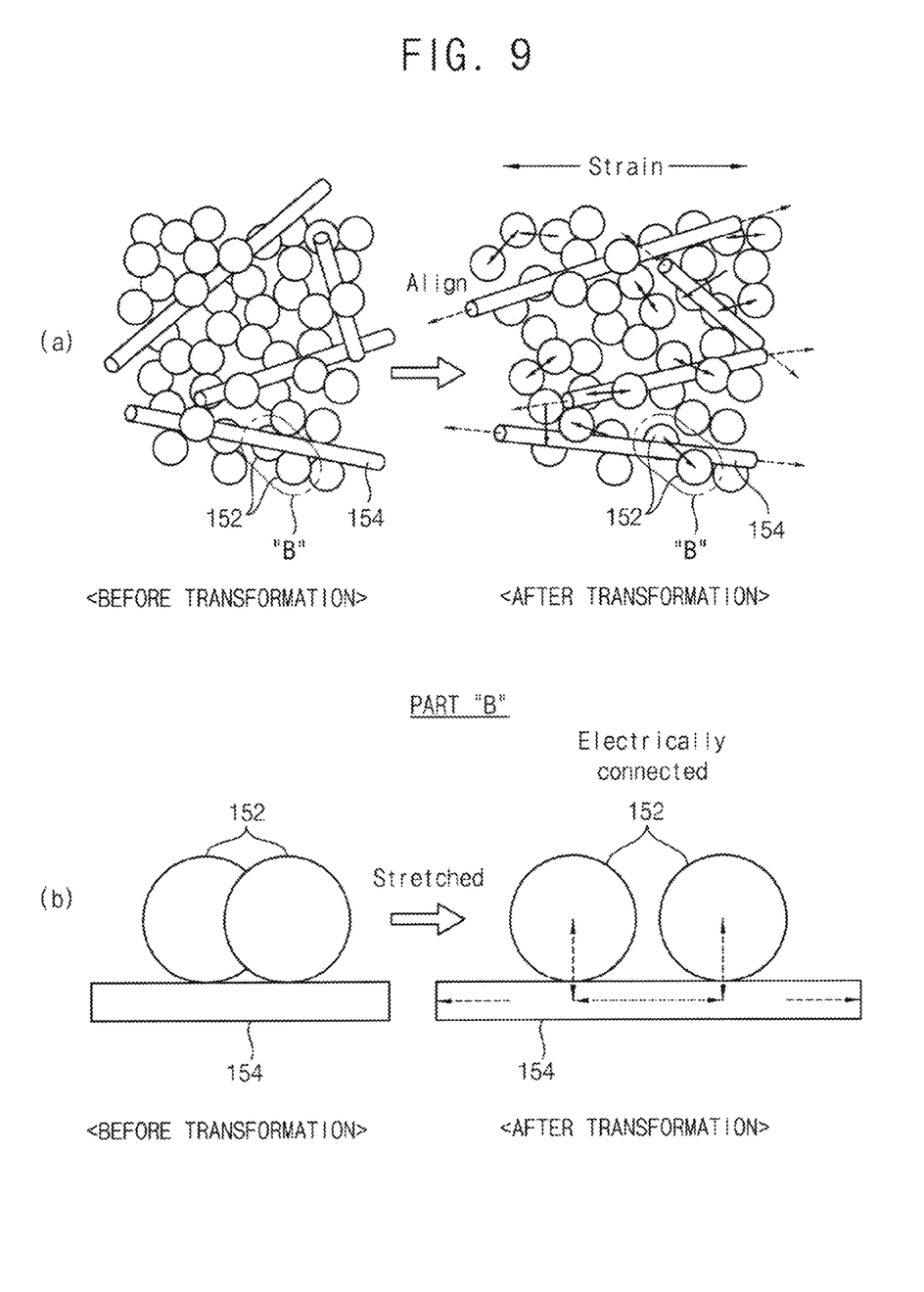
FIG. 9 shows a state in which the metal nanoparticles and the CNTs are electrically connected even when a large deformation force is applied is maintained when the conductive line of the strain sensor is composed of the nanomaterial mixture of metal nanoparticles and CNTs, according to an example embodiment of the present disclosure.

In contrast, referring to FIG. 9, in the strain sensor of which conductive line 160 is printed using a composite nanomaterial in which the metal nanoparticles 152 and the CNTs 154 are mixed as the printing mixture according to the embodiment of the present disclosure, the conductive line 160 may be configured in a form in which the CNTs 154 are mixed between the metal nanoparticles 152. The conductive line 160 having this structure can have high measurement sensitivity as well as a wide measurable range of strain. When a strain is applied to the flexible substrate 110a, even if the metal nanoparticles 152 may be separated from each other, they can continue to have electrical connectivity through the CNTs 154. In addition, the CNTs themselves also have some elasticity. Accordingly, the resistance of the conductive line 160 of the strain sensor 200 changes relatively less, so that the measurable range of strain is much wider and the sensitive strain sensor can be made.

Figure 10:
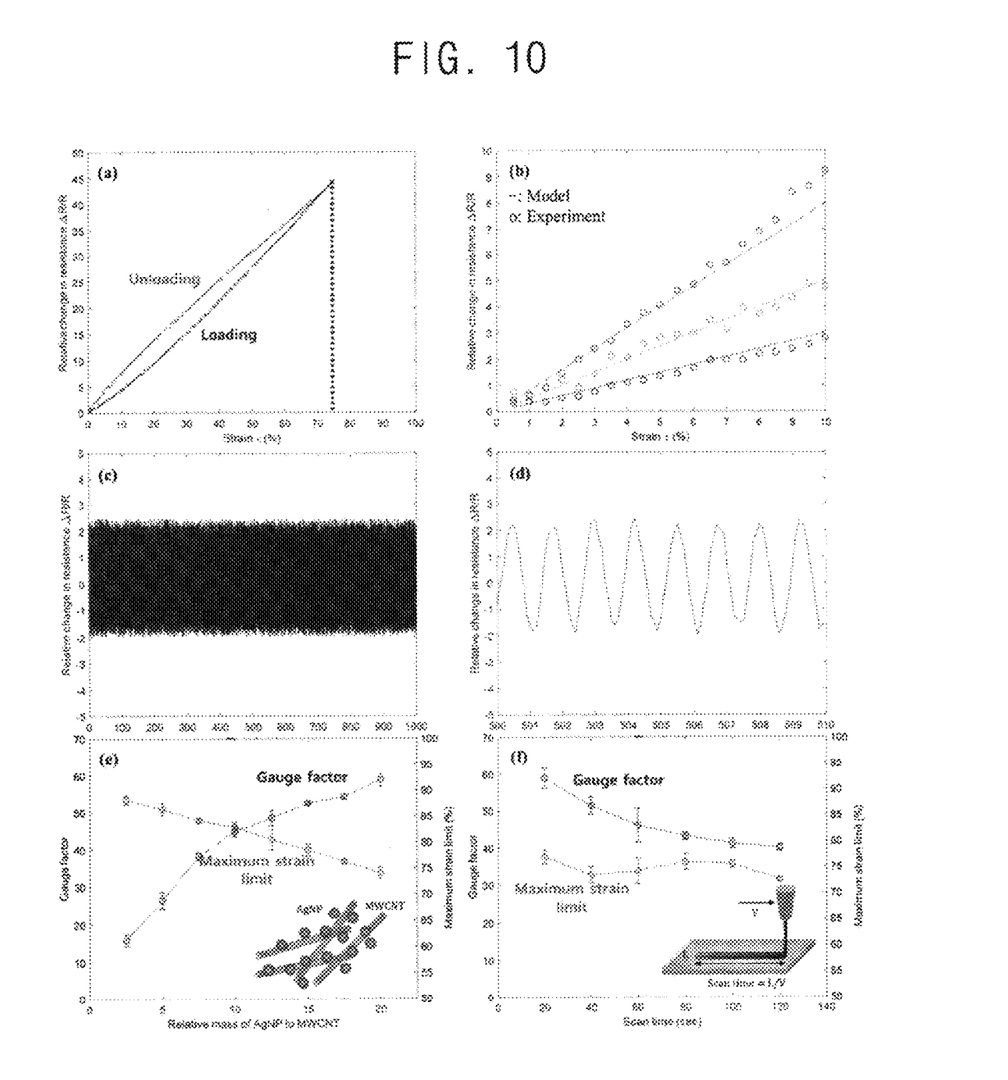
FIG. 10 is a graph showing a performance evaluation result of a strain sensor actually fabricated according to an example embodiment of the present disclosure.

FIG. 10 illustrates several graphs showing performance evaluation results of a strain sensor actually fabricated by printing the mixture of AgNPs and CNTs on the PDMS substrate according to an embodiment of the present disclosure.

Graph (a) of FIG. 10 shows the result of measuring the change in relative resistance up to the maximum measurable range. The strain sensor was deformed up to a strain of about 75% of the existing length, and finally showed a resistance value of 45 times the initial resistance. Based on the gauge factor (relative change value of resistance/strain value), which is an index frequently used to indicate the sensitivity of the strain sensor, it exhibited a high sensitivity of 50 or more.

Graph (b) of FIG. 10 shows the results of comparing the actual experimental values and simulation values of the model presented through statistical analysis using a two-variable probit mode. The analysis was done by discretizing the case where electrical connection between the AgNPs and the CNTs was maintained and the case where their electrical connection was lost, respectively. It was assumed that when assuming 1 for the case of electrical connectivity between AgNPs and 0 for the non-electrical connection therebetween, the probability of changing from 1 to 0 at a specific displacement value follows a normal distribution. As a result, it could be seen that the proposed model represented the behavior of the actual strain sensor well.

Graphs (c) and (d) of FIG. 10 show the results of experiments to evaluate the life cycle of the manufactured strain sensor. For the experiment, the process of pulling the strain sensor and restoring it to its original state was performed about 1,000 times. For the experiment, it could be seen that the resistance value of the strain sensor had an error within 5% when pulled to the maximum displacement.

Graph (e) of FIG. 10 shows the result of an experiment by changing the composition ratio of AgNPs and CNTs. As a result, as the mass of AgNPs increased compared to CNTs, the sensitivity of the strain sensor increased and the measurable range decreased. That is, it can be seen that the measurable range and the sensitivity have a trade-off relationship. Depending on the application field, the optimal values of the measurable range and the sensitivity may be determined. For example, in applications that do not require high sensitivity, such as soft robots, but require a wide measurable range, a lower mass of AgNPs compared to CNTs may be appropriate. On the other hand, in applications that require high sensitivity, such as vibration sensors, but are not significantly related to the measurable range, a higher mass of AgNPs compared to CNTs may be appropriate.

Graph (f) of FIG. 10 shows the change in sensitivity and measurable range according to the scan time of the manufacturing process. The scan time is a value indicating the time it takes to print a conductive pattern of a unit length. A large value of the scan time means that the nozzle stays at the same position for a long time. Accordingly, as the amount of metal nanoparticles and CNTs per unit volume inside the conductive pattern is controlled, the electrical properties of the conductive line 160 pattern are changed. As a result of the experiment, it was shown that both the sensitivity and the measurable range of the strain sensor decreased as the scan time increased.

The present disclosure can be used to fabricate the strain sensor using a flexible substrate. Furthermore, it may be widely used to fabricate other conductive patterns using flexible substrates.

Although the embodiments have been described with reference to the limited drawings as described above, with respect to the embodiments of the present disclosure disclosed in the specification, specific structural or functional descriptions are only exemplified for the purpose of describing the embodiments of the present disclosure. Embodiments of the present disclosure may be embodied in various forms, and should not be construed as being limited to the embodiments described herein. That is, since the present disclosure may have various changes and may have various forms, specific embodiments will be illustrated in the drawings and described in detail in the specification. However, this is not intended to limit the present disclosure to the specific disclosed form, it should be understood to include all modifications, equivalents and substitutes included in the spirit and scope of the present disclosure. It will be understood by those skilled in the art that various modifications and changes can be made in the present disclosure without departing from the spirit and scope of the present disclosure as set forth in the following claims. Therefore, other implementations, other embodiments, and equivalents to the claims are also within the scope of the following claims.

What is claimed is:

1. A method of manufacturing a flexible strain sensor, comprising:

placing a flexible substrate on a movable stage in a working chamber in which the movable stage capable of a desired movement according to a control signal, and an nozzle capable of jetting toward an upper surface of the movable stage are installed therein, and with which a first pressure control unit capable of controlling an internal pressure of the working chamber is combined, and preparing a printing material mixture including metal nanoparticles and carbon nanotubes (CNTs) in a form of powder to be input into a printing material tank provided with an upper outlet communicating with a nozzle through a first communication pipe and a lower inlet to which a second pressure control unit capable of controlling pressure is combined;

controlling, by a control unit, a movement of the movable stage by providing a predetermined movement control signal to the movable stage to move the flexible substrate at a desired speed along a path corresponding to a predetermined conductive line pattern of a strain sensor;

forming a relatively low pressure atmosphere inside the working chamber by operating the first pressure control unit, and simultaneously a relatively high pressure atmosphere at a lower inlet of the printing material tank by operating the second pressure control unit;

in parallel with the controlling the movement of the movable stage, forcibly conveying the printing material mixture in an aerosolized state through the first communication pipe from the printing material tank, to be jetted out through the nozzle toward a surface of the flexible substrate by a compression wave caused by a pressure difference between the low pressure atmosphere and the high pressure atmosphere;

directly printing a predetermined conductive line pattern of the strain sensor on the flexible substrate through a process in which the printing material mixture jetted out through the nozzle collides with the surface of the flexible substrate to create cracks on the surface, and the CNTs penetrate into the cracks and are mechanically locked with the flexible substrate, and then following metal nanoparticles and CNTs of the printing material mixture are deposited to a predetermined width and height on the surface of the flexible substrate;

connecting first and second lead wires, which electrically extend to protrude out of the flexible substrate, to both ends of the predetermined conductive line pattern of the strain sensor; and bonding a flexible cover having a same size as the flexible substrate to the surface of the flexible substrate on which the predetermined conductive line pattern is printed, so that the predetermined conductive line pattern is sandwiched between the flexible substrate and the flexible cover.

2. The method of claim 1, wherein the flexible substrate and the flexible cover have a same shore hardness of 10 to 70 based on shore A or have a same shore hardness of 22 or less based on shore D.

3. The method of claim 1, wherein the flexible substrate and the flexible cover are made from polydimethylsiloxane (PDMS).

4. The method of claim 1, wherein the predetermined conductive line pattern includes a plurality of linear conductive lines each of which extends linearly by a predetermined length in a first direction, and the plurality of linear conductive lines are arranged side by side to form a series connection while maintaining a predetermined distance between each other in a second direction perpendicular to the first direction, and wherein a cross-sectional structure of the plurality of linear conductive lines includes a seed layer, mechanically locked on the surface of the flexible substrate, formed by making the CNTs penetrate and fix into cracks irregularly formed on the surface of the flexible substrate; and a mixture layer of the metal nanoparticles and the CNTs formed by depositing the metal nanoparticles and the CNTs on the seed layer to have a predetermined width and height.

5. The method of claim 1, wherein the directly printing of the predetermined conductive line pattern includes: forming a seed layer mechanically locked on the surface of the flexible substrate by making the printing material mixture of the metal nanoparticles and the CNTs from the nozzle collide the surface of the flexible substrate to form irregular cracks so that the CNTs penetrate and fix into the cracks on the surface of the flexible substrate; and printing the predetermined conductive line pattern on the surface of the flexible substrate by applying the printing material mixture subsequently jetted to the seed layer at a high speed to be deposited on the seed layer to a predetermined width and height through bonding with the CNTs of the seed layer.

6. The method of claim 5, wherein the directly printing of the predetermined conductive line pattern includes: monitoring, by a monitoring unit, a size of the printing material mixture deposited on the surface of the flexible substrate to be provided to the control unit; and controlling, by the control unit, movement speed of the movable stage on which the flexible substrate is placed based on the monitored information from the monitoring unit.

7. The method of claim 1, wherein the relatively low pressure atmosphere in the working chamber is a pressure atmosphere of 1 torr to 10 torr.

8. The method of claim 1, wherein the controlling of the movement of the movable stage includes adjusting, by the control unit, a distance from the nozzle to the movable stage so that the printing material mixture is aerodynamically focused on the surface of the flexible substrate when the printing material mixture is jetted out through the nozzle.

9. The method of claim 1, wherein the mixing ratio between the metal nanoparticles and the CNTs in the printing material mixture is in a range of 60%-90% by weight to 40%-10% by weight.

10. A flexible strain sensor, comprising:
a flexible substrate;
a predetermined conductive line pattern directly printed on a surface of the flexible substrate; and
a flexible cover covering and bonded to the surface of the flexible substrate on which the predetermined conductive line pattern is printed so that the predetermined conductive line pattern is sandwiched between the flexible cover and the flexible substrate,
wherein the predetermined conductive line pattern includes a plurality of linear conductive lines each of which extends linearly by a predetermined length in a first direction, and the plurality of linear conductive lines are arranged side by side to form a series connection while maintaining a predetermined distance between each other in a second direction perpendicular to the first direction, and
wherein a cross-sectional structure of the plurality of linear conductive lines includes a seed layer, mechanically locked on the surface of the flexible substrate, formed by making the CNTs penetrate and fix into cracks formed on the surface of the flexible substrate; and a mixture layer of the metal nanoparticles and the CNTs formed by depositing the metal nanoparticles and the CNTs on the seed layer to have a predetermined width and height.

11. The flexible strain sensor of claim 10, wherein the flexible substrate and the flexible cover have a same shore hardness of 10 to 70 based on shore A or have a same shore hardness of 22 or less based on shore D.

12. The flexible strain sensor of claim 10, wherein the flexible substrate and the flexible cover are made from PDMS.

13. The flexible strain sensor of claim 10, wherein the mixing ratio between the metal nanoparticles and the CNTs in the mixture layer is in a range of 60%-90% by weight to 40%-10% by weight.

* * * * *